United States Patent

[11] 3,591,274

[72] Inventor Philip Joseph Donald
Woodbury, N.J.
[21] Appl. No. 828,261
[22] Filed May 27, 1969
[45] Patented July 6, 1971
[73] Assignee RCA Corporation

[54] PROJECTION OF COLOR-CODED B AND W TRANSPARENCIES
5 Claims, 5 Drawing Figs.

[52] U.S. Cl. 353/20, 350/162 SF, 353/84, 353/97
[51] Int. Cl. G03b 21/14
[50] Field of Search 353/84, 20, 97; 350/162, 162 SF

[56] References Cited
OTHER REFERENCES

Jenkins and White, FUNDAMENTALS OF OPTICS, York, Pa., The Maple Press Co., 1957, p.6

*Primary Examiner*—Leonard Forman
*Assistant Examiner*—Steven L. Stephan
*Attorney*—H. Christoffersen ABSTRACT: A system including a light source and lens means for projecting a color image from a black and white transparency on which the image is diffraction-grating coded in different directions for respective different colors. In addition to the lens means, the system includes between the light source and the utilization plane, in the order named, a filter mask, a color-coded, black and white transparency and an apertured plate. The lens means is constructed to image the filter mask at the apertured plate, and to image the transparency at the utilization plane. The filter mask includes many colored filter strips, the filter strips being related, dimensioned and oriented with reference to the apertured plate, so that the light passing through each of the plurality of apertures contributes to the brightness of the color image at the utilization plane.

INVENTOR.
PHILIP JOSEPH DONALD
BY
Carl V. Olson

PROJECTION OF COLOR-CODED B AND W TRANSPARENCIES

BACKGROUND OF THE INVENTION

In the field of graphic systems, it is often necessary to transmit, manipulate, modify, project, display and reproduce the graphic information. When the graphic information is polychromatic or a color image, transmission of the information over limited bandwidth communications channels is complicated and time consuming because of the need to transmit the various color components of the image. To simplify the transmission, it is known to transmit a color image in the form of a color-coded black and white image, from which the color image can be reconstituted at the receiving end of the transmission channel. If the color image is utilized at the receiving end to make color printing plates, the received color-coded black and white image may be successively decoded to produce three or four color separation negatives needed in the preparation of corresponding printing plates. When a color-coded black and white transparency is employed in a system, it is also necessary or desirable to employ the transparency to display or project the recorded image in color for monitoring purposes, or for photographically reproducing the image in color with a desired degree of enlargement.

It is known to expose black and white film through a color-coding diffraction grating or mask to record a color image in coded form on the black and white film. The film so exposed is developed photographically through a reversal process to form a black and white transparency. A reconstituted color image can be projected from the black and white transparency by illuminating the transparency with a point source light, and by interposing a filter mask in the optical path, including lenses, between the transparency and a viewing screen or utilization device. Known methods of projection have required the use of a small or point source of light which, being small, provides a limited amount of light. Consequently, the projected color image lacks a desired degree of brightness, particularly when the projected image is considerably larger than the transparency. Such a system is described in U.S. Pat. No. Re. 20,748, issued to Cario Bocca on June 7, 1938. The use of a laser to provide a bright point source of light is unsatisfactory because of problems encountered due to the effects of dust and other imperfections in the optical path.

In a copending U.S. Pat. application, Ser. No. 750,884, filed on Aug. 7, 1968, by the present inventor and assigned to the same assignee, there is described an improved means for decoding a color-coded black and white transparency and projecting the color image at a much higher brightness level than was previously practical. This is accomplished by employing a light source constituted of a large number of small light sources arranged in a regular array. A color decoded filter mask is constructed with dimensions that are proportioned to the dimensions of the array of small light sources. The color-decoding filter mask includes a number of spaced parallel colored filter strips for each color to be extracted, the filter strips of different colors being angularly related. All the elements are constructed and arranged with dimensions and geometries such that each small individual light source contributes to the brightness of the reconstituted color image.

SUMMARY OF THE INVENTION

The system according to the invention for projecting color-coded black and white (B & W) transparencies differs from prior art arrangements in that the light source aperture (or apertures) and the color filter mask are transposed in position in the system. The construction according to the invention has the important advantage that the color filters in the filter mask are not in a portion of the optical path carrying the image being projected, and therefore, the projected image is not degrated by the inevitable optical imperfections in the color filters.

DESCRIPTION OF THE PREFERRED EMBODIMENT

Figure 1:
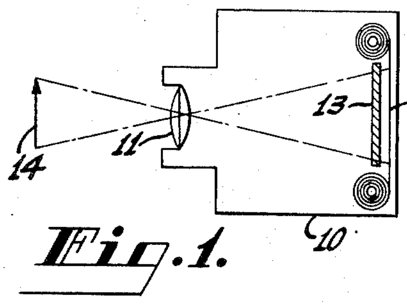
FIG. 1 is a representation of a camera for photographing a color image or scene on a black and white film so that the film records the brightness information and also the color information of the image.

Reference is now made to FIG. 1 showing a camera including an enclosure 10, a lens 11, a panchromatic black and white film 12 and a trichromatic spatial filter 13. The filter 13 is disposed in the path of light from image 14 impinging on film 12, and it is in close proximity with, or in contact with, film 12.

Figure 2:
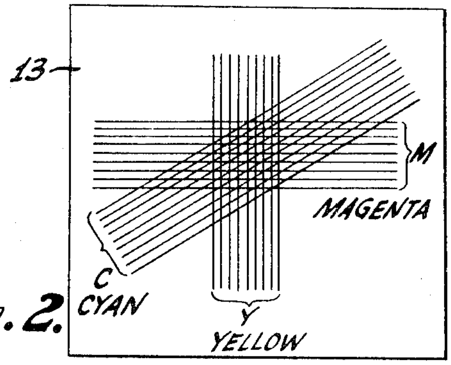
FIG. 2 is a representation of a trichromatic spatial color filter utilized in the camera of FIG. 1.

The filter 13 in the camera of FIG. 1 is represented in FIG. 2 as including a large number of vertical yellow filter strips Y, a large number of horizontal magenta filter strips M and a large number of diagonal cyan filter strips C. The three described sets of filter strips are in the three subtractive primary colors. The colored filter strips occupy the entire effective area of the filter 13, although only a limited number of the filter strips are included for reasons of clarity in the drawing of FIG. 2. The filter strips of each color are preferably very thin and close together to preserve image definition. There may be about 300 parallel spaced filter strips of one color per inch. The cyan filter strips C are shown disposed at 30° and 60° angles with the magenta and yellow filter strips, respectively. The particular angular relationships shown are advantageous but not essential. The image light of a given color going through a corresponding filter strip grating is recorded as closely spaced parallel lines on the black and white film. The parallel lines have an extent in area and a density corresponding with the extent and amount of the particular color in the original image.

Figure 3:
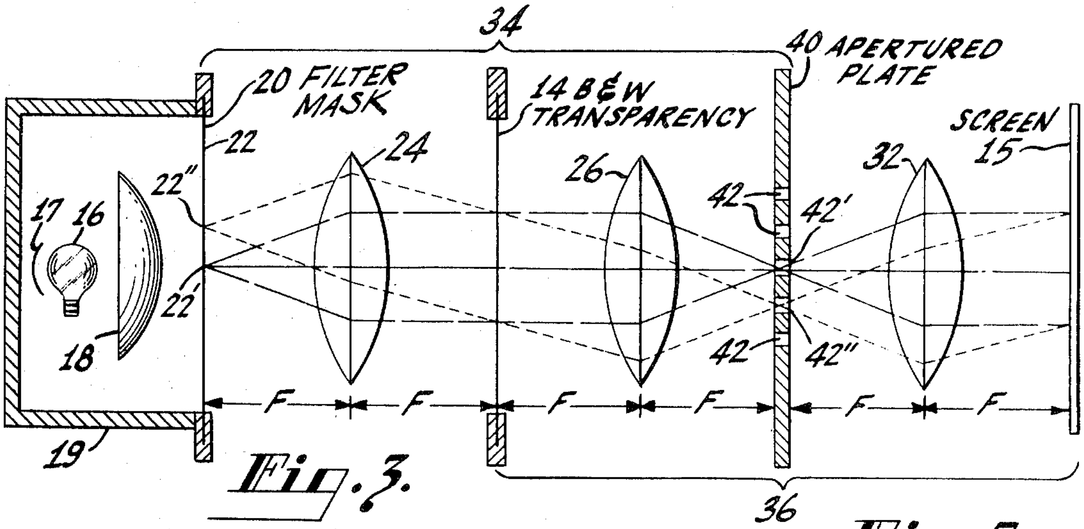
FIG. 3 is a representation of means for illuminating a color-coded black and white transparency made using the camera of FIG. 1, and for projecting therefrom a reconstituted color image.
Figure 4:
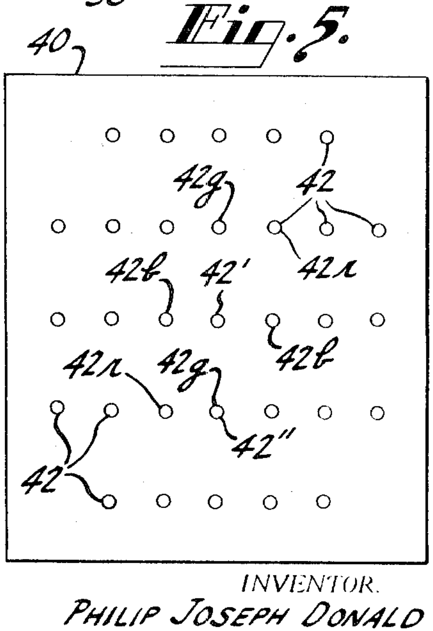
FIG. 4 is a diagram of a color filter mask included in the system of FIG. 3.

FIG. 3 illustrates a system for illuminating a black and white transparency 14 made with the camera of FIG. 1 and projecting a reconstituted color image onto a screen or utilization device 15. The system includes a large white light source 16, a back reflector 17 and a condenser lens 18 in an enclosure 19 having a filter mask 20. The filter mask 20 is shown in FIG. 4 to consist of spaced horizontal blue filter strips B, spaced vertical green filter strips G, and spaced diagonal red filter strips R. The red filter strips are oriented to make angles of 60° with the horizontal blue strips, and angles of 30° with the vertical green strips.

The light passing through the filter mask 20 is directed by a collimating lens 24 to the black and white transparency 14. Light passing through the transparency 14 is passed by lens 26 to an apertured plate 40. Light passing through the apertured plate 40 is passed through a lens 32 to the imaging screen 15. In the example of the invention shown in FIG. 3, the lenses 24, 26 and 32 have equal focal lengths F, and are positioned one focal length F on each side from adjacent elements in the optical path from the filter mask 20 to the viewing screen 15. This being so, the filter mask 20 is spaced from the apertured plate 40 a distance 34 equal to four focal lengths F, with the result that the color filter intersections in mask 20 are imaged with the same dimensions at the apertures in the apertured plate 40. Similarly, the distance 36 between the black and white transparency 14 and the viewing screen 15 is equal to four focal lengths F, with the result that the transparency is imaged on the viewing screen 15 in a one-to-one dimensional correspondence.

The system of FIG. 3 is illustrated with three lenses of equal focal length, and with equal spacing between elements in the optical path, for the purpose of simplifying the explanation of the operation of the system. Many other equivalent optical arrangements may be used. A larger or smaller number of lenses of different focal lengths, with appropriate spacing of the elements, may be used if desired. Different known arrangements, particularly as regards lens 32, may be preferred in order that the color image projected on the viewing screen 15 will be much larger than the image on the black and white transparency 14.

In all suitable optical arrangements it is necessary that the intersections of the colored filter strips R, B and G of the filter mask 20 be imaged in the plane of the apertured plate 40 in registry with the apertures therein. It is also necessary that the optical system image the transparency 14 on the display screen 15, or in a plane suitably positioned for viewing the virtual image.

The color filter mask 20 in the system of FIG. 3 is shown in FIG. 4 to consist of spaced horizontal blue filter strips B, spaced vertical green filter strips G, and spaced diagonal red filter strips R. The red filter strips are oriented to make angles of 60° with the horizontal blue strips, and angles of 30° with the vertical green strips. The filter strips in FIG. 4 have common intersections 22 which are imaged by lenses 24 and 26 at the apertures 42 in the apertured plate 40. That is, one blue strip, one red strip and one green strip have one common intersection at a point which is imaged at one aperture in plate 40. An intersection or crossover of three color filter strips normally blocks the passage of substantially all light therethrough. The intersection or crossover of the three color filter strips may be viewed as a central area around which color filters of different colors are arranged at angular positions related to the directions of diffraction coding for the respective colors. The central area should not pass colored light, but it may pass an appropriate amount of white light to contribute to the B & W or luminance portion of the color image created on the screen 15.

Figure 5:
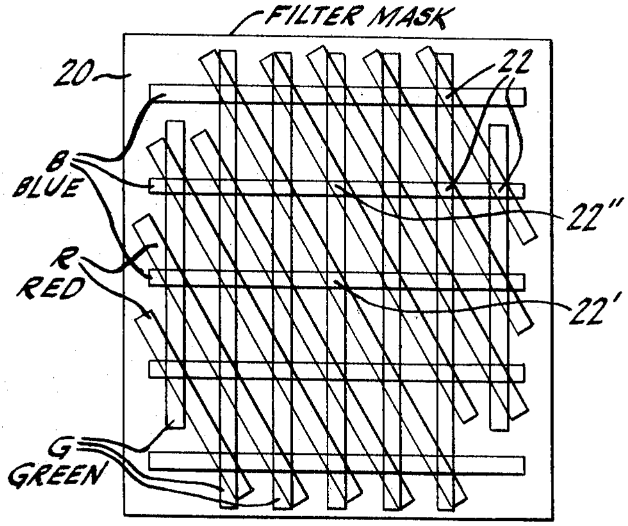
FIG. 5 is a diagram illustrating a plate containing an array of small apertures used in the system of FIG. 3.

The array of apertures 40 shown in FIG. 5 are registered with the image of the array of color filter intersections 22 in FIG. 4. While it is not necessary that the array of filter intersections be exactly the same size as the array of apertures, it is convenient to make them so. The areas on the surface of the filter mask of FIG. 4 which are not occupied by any filter strip are preferably made opaque to prevent passage therethrough of unused light.

All the filter strips in FIG. 4 have the same width, which is substantially equal to the diameter of an aperture 42 in the plane of apertured plate 40. The width of each strip and the diameter of each aperture may be the same, and may, for example, be 1/32 of an inch. The diagonal filter strips R are spaced apart an amount equal to their width. This being the case, and because of the 30°, 60° relationships, the vertical filter strips G are spaced apart a greater amount, and the horizontal filter strips B are spaced apart a still greater amount. The spacings of the vertical and horizontal filter strips are the same as, or in the same proportion as, the spacings of the columns and rows of the apertures 42 in the array of FIG. 5. Each intersection of R, G and B filter strips in FIG. 4 is imaged by lenses 24 and 26 at a corresponding aperture in FIG. 5.

The filter strips in the color decoding filter mask of FIG. 4 are filter strips in the tree primary colors of the additive system, whereas the three color strips in the encoding mask of FIG. 2 are in the three primary colors of the subtractive system. The horizontal blue filter strips in FIG. 4 cooperate with the color information produced by the vertical yellow filter strips in FIG. 2; the vertical green color strips in FIG. 4 cooperate with the information coded by the horizontal magenta strips in FIG. 2; and the diagonal red color strips in FIG. 4 cooperate with the color information encoded by the diagonal cyan color strips in FIG. 2.

In the operation of the color-decoding and projection system of FIG. 3, light is normally blocked from passing through the central one 22′ of the color filter intersections by the three overlapping color filters. If this light were not blocked it would take paths within a volume illustrated by the dashed lines in going through the lens 24, transparency 14, lens 26, aperture 42′ in apertured plate 40 and lens 32 to the viewing screen 15. However, blue light passing through the portion of the blue filter strip immediately to the left and to the right of the intersection 22′ is passed through the lens 24 and through the B & W transparency 14. The portions of the blue light from each of the two portions of the blue filter, in passing through the color-coded black and white transparency 14, are each diffracted in both left and right horizontal directions by the blue-coded grating on the transparency. A portion of the diffracted blue light usefully passes through the aperture 42′ in the apertured plate of FIG. 5, and on to the utilization screen 15. It may be said, as a rough approximation, that half of the diffracted blue light from the recited filters usefully passes through the aperture 42′. That is, the blue light passing through the aperture 42′ includes light from the blue filter on the left side of the intersection 22′ which is diffracted to the right, and light from the blue filter on the right side of the intersection 22′ which is diffracted to the left.

Similarly, red and green light passed through the portions of red and green filter strips in the immediate vicinity of the intersection 22′ is diffracted in passing through the B & W transparency so that half of the first order diffraction components pass through the aperture 42′ and go on to the screen 15. The light passing through the filter mask in the immediate vicinity of the color filter intersection 22′ therefore results in the creation of a color image on the viewing screen 15. However, the image so produced lacks brightness because only a limited amount of light is available from the limited described area of the filter mask 20 adjacent the intersection 22′.

As thus far described, light passed through the color filters in the immediate vicinity of the intersection 22′ pass through the transparency 14, and half of the first order diffraction components continue on through the aperture 42′ to create a color image on the screen 15. In addition, the other half of the first order diffraction components pass through apertures in plate 40 adjacent to aperture 42′. That is, blue diffraction components go through adjacent apertures 42*b*, green diffraction components go through adjacent apertures 42*g* and red diffraction components go through apertures 42*r*. This is so because light is diffracted in two opposite directions and because the spacings of the apertures in the aperture array are selected in accordance with the amounts that the light of respective different colors are diffracted.

It has been shown that the invention can be practiced using a filter mask consisting of one color filter of each color arranged around a central area at angular positions related to the directions of diffraction coding for the respective colors. The invention may be practiced with an aperture plate having a single aperture, or a single aperture together with additional surrounding apertures having appropriate spacings. The embodiment of the invention shown in the drawing has a filter mask including many filter strips for the purpose of proportionally increasing the brightness of the color image projected onto screen 15.

Additional illumination is provided by the light passing through the filter mask in the vicinity of the intersection 22″, from which light takes paths within a volume represented by the dotted lines in FIG. 3. Light from the vicinity of intersection 22″ illuminates the same entire area of the transparency 14 and it projects the image thereon to the same area of the viewing screen 15. Light from the source 16 does not go through the intersection 22″ because the point 22″, as shown in FIG. 4, is an intersection of blue, red and green filter strips which block light from passing therethrough. However, the colored light going through portions of the color filter strips in the immediate vicinity of the intersection 22″ produce first and higher order diffraction terms representing the color information in the transparency 14 which do pass through the aperture 42'', and through adjacent apertures in plate 40, to recreate the image in color on the viewing screen 15.

What has been said about the light from the vicinity of intersections 22' and 22'' in relation to the apertures 42' and 42'', respectively, and surrounding apertures in the apertured plate 40, can be said also about light from the vicinity of all other individual intersections in relation to corresponding apertures in the plate 40. The brightness of the reproduced image on the viewing screen 15 is thus increased in proportion to the number of filter intersections 22 and apertures 42 employed. The greatly increased brightness is accomplished by the relatively simple and inexpensive means described, and is accomplished without the degrading effect of optically imperfect color filters in the image path between transparency 14 and screen 15.

What I claim is:

1. A system for projecting a color image from a developed black and white film on which the color image is diffraction coded by diffraction gratings having lines extending in different directions for respective different colors, comprising a light source, a color filter plane, a film plane, an aperture plane, and a utilization plane, each plane intersecting an optical axis in the order named, which axis includes the sources, lens means to image the color filter plane at the aperture plane, and to image the film plane at the utilization plane, a color filter mask located in said color filter plane, said filter mask including areas of different colors arranged so that the areas of each color will lie along a plurality of parallel lines which are perpendicular to the direction of the diffraction grating lines for the respective colors, said plurality of parallel lines each passing through central areas, and aperture means in said aperture plane at points where said central areas in said filter mask are imaged.

2. A system as defined in claim 1 wherein said color filter mask located in said color filter plane includes color filter strips of respective different colors, the filter strips of different colors having a common intersection at said central area.

3. A system as defined in claim 2 wherein said color filter strips include a plurality of color strips of each color, the color strips of each one color being parallel to each other, the filter strips of different colors having a plurality of common intersections, and wherein said aperture means includes an array of apertures, each aperture being located at a point where a respective one of the common intersections of color strips of different colors is imaged.

4. A system as defined in claim 1 wherein said filter mask includes a plurality of said central areas each having color filters arranged therearound, and wherein said aperture means in said aperture plane includes a plurality of apertures located at points where respective central areas are imaged.

5. A system for projecting a color image from a developed black and white film on which the image is diffraction coded by diffraction gratings having lines extending in different directions for respective different colors, comprising a light source, a color filter plane, a film plane, an aperture plane, and a utilization plane, each plane intersecting an optical axis in the order named, which axis includes the source, lens means to image the color filter plane at the aperture plane, and to image the film plane at the utilization plane, a color filter mask located in said color filter plane, said filter mask including areas of different colors arranged so that the areas of each color will lie along a plurality of parallel lines which are perpendicular to the direction of the diffraction grating lines for the respective color, and an apertured plate located in said aperture plane and including an array of apertures positioned to pass light that is diffracted by said film.

Disclaimer 3,591,274.—*Philip Joseph Donald*, Woodbury, N.J. PROJECTION OF COLOR-CODED B AND W TRANSPARENCIES. Patent dated July 6, 1971. Disclaimer filed May 12, 1972, by the assignee, *RCA Corporation.*

Hereby enters this disclaimer to all claims of said patent.

[*Official Gazette January 2, 1973.*]